United States Patent
Hopper et al.

(10) Patent No.: US 10,706,618 B2
(45) Date of Patent: Jul. 7, 2020

(54) 3D BUILDING MODELING SYSTEMS

(71) Applicant: Aurora Solar Inc., San Francisco, CA (US)

(72) Inventors: Christopher Hopper, San Francisco, CA (US); Matthew Stevens, Boston, MA (US)

(73) Assignee: AURORA SOLAR INC, San Francisco, CA (US)

( * ) Notice: Subject to any disclaimer, the term of this patent is extended or adjusted under 35 U.S.C. 154(b) by 0 days.

(21) Appl. No.: 16/101,448

(22) Filed: Aug. 11, 2018

(65) Prior Publication Data

US 2019/0051043 A1    Feb. 14, 2019

Related U.S. Application Data

(60) Provisional application No. 62/544,694, filed on Aug. 11, 2017.

(51) Int. Cl.
*G06T 17/05* (2011.01)
*G06T 17/20* (2006.01)
*G06T 15/00* (2011.01)
*G06T 19/20* (2011.01)

(52) U.S. Cl.
CPC ............ *G06T 17/05* (2013.01); *G06T 15/005* (2013.01); *G06T 17/20* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2012/0253753 A1* | 10/2012 | Strassenburg-Kleciak | ............... G01C 21/3638 703/1 |
| 2015/0161300 A1* | 6/2015 | Hopper | ................. G06T 17/005 703/1 |
| 2015/0234947 A1* | 8/2015 | Hopper | ............. G06K 9/00637 703/1 |

OTHER PUBLICATIONS

Aichholzer, Oswin, and Franz Aurenhammer. "Straight skeletons for general polygonal figures in the plane." International computing and combinatorics conference. Springer, Berlin, Heidelberg, 1996.*

(Continued)

*Primary Examiner* — Ryan M Gray
(74) *Attorney, Agent, or Firm* — Fenwick & West LLP

(57) ABSTRACT

Described herein is a process and system for constructing three-dimensional (3D) representations of buildings. The 3D representations of buildings are semantic models that include roof nodes, roof edges, as well as roof faces with associated properties (e.g., pitch, azimuth). The system receives a 2D representation such as a roof outline including nodes connected by edges and associated data such as a height value, a pitch value, an independent structure, or a dependent structure. The system determines height values where a building structure changes. The system propagates a wavefront representing a cross-section of the building to the height values to generate 3D model edges. The 3D representation is generated based on the 3D model edges. The system can create 3D representations of buildings including roof structures of arbitrary complexity and can create representations of dependent roof structures such as dormers.

20 Claims, 10 Drawing Sheets

(56) References Cited

OTHER PUBLICATIONS

Held, Martin, and Peter Palfrader. "Additive Weights for Straight Skeletons." Proc. 32nd EuroCG. 2016. 131-134.*
Biedl, Therese, et al. "Weighted straight skeletons in the plane." Computational Geometry 48.2 (2015): 120-133.*

* cited by examiner

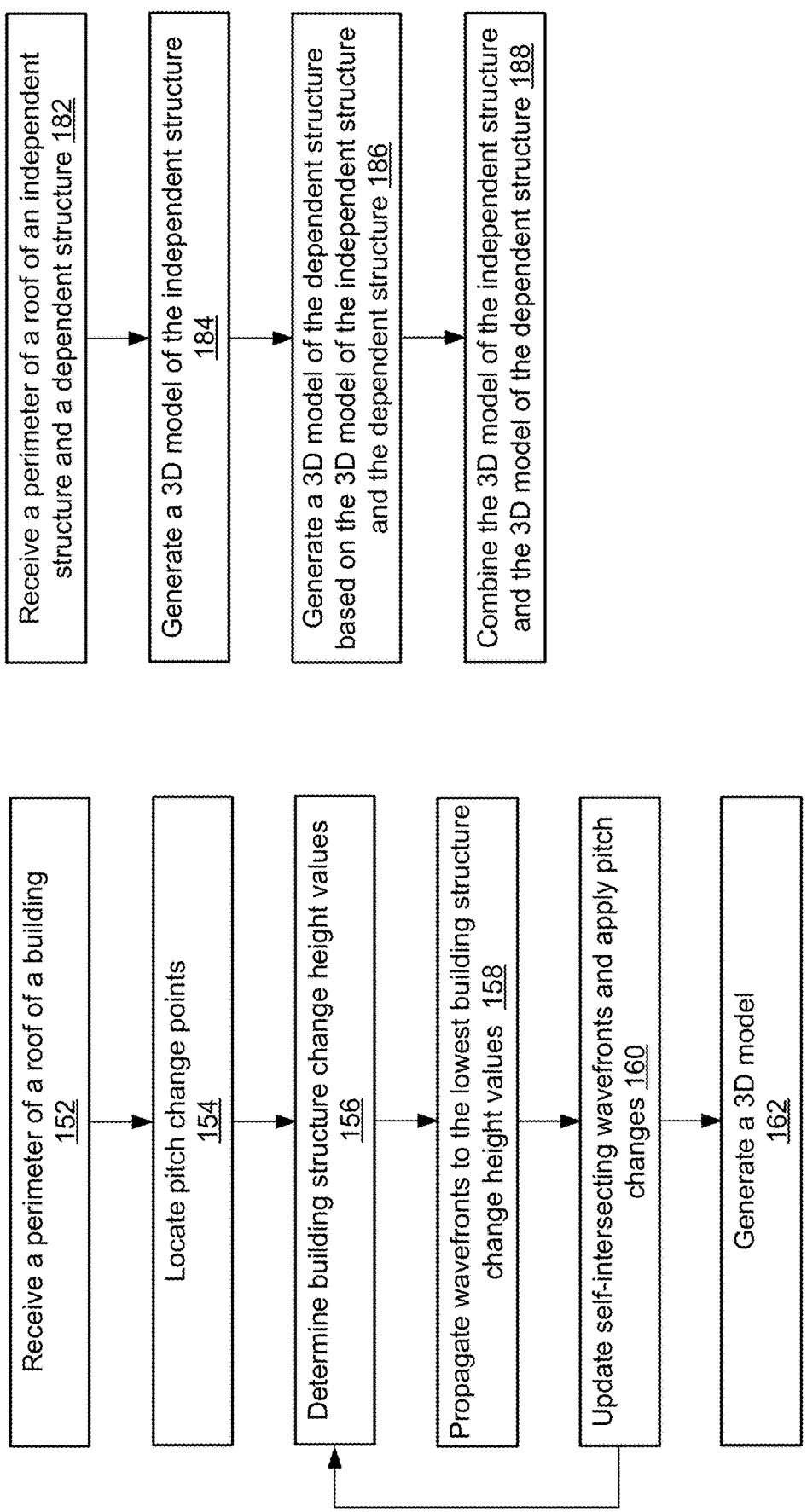

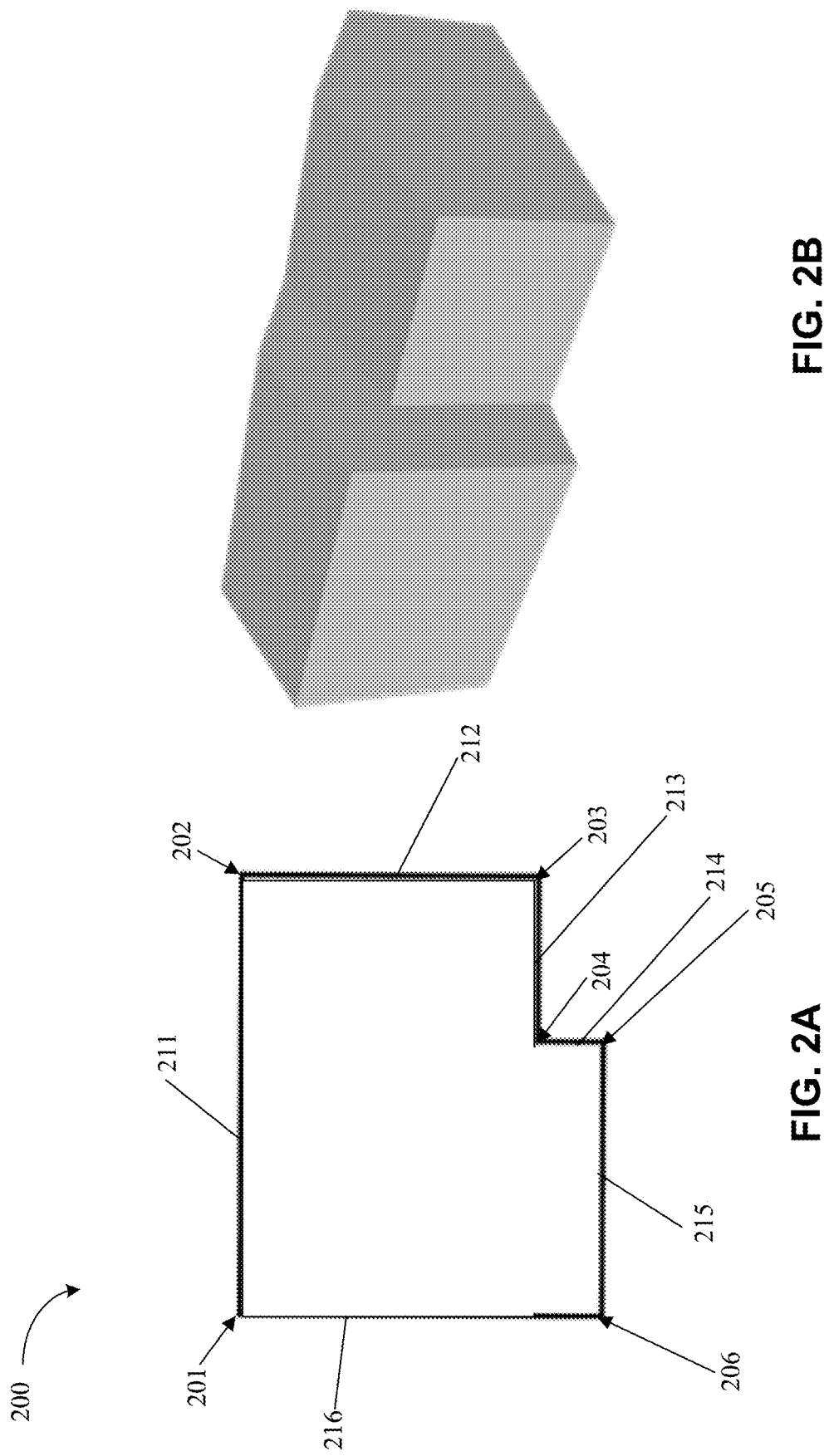

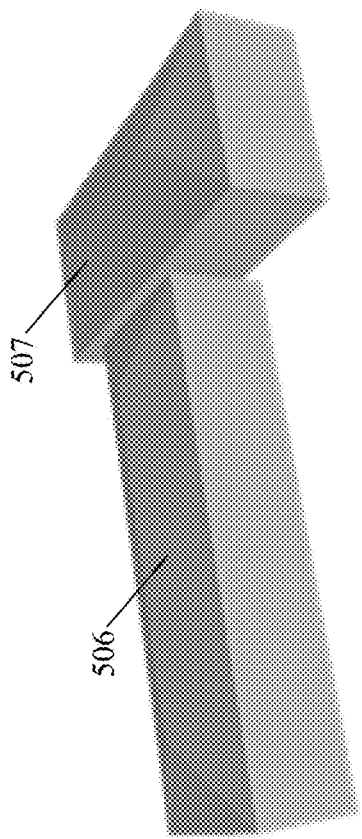
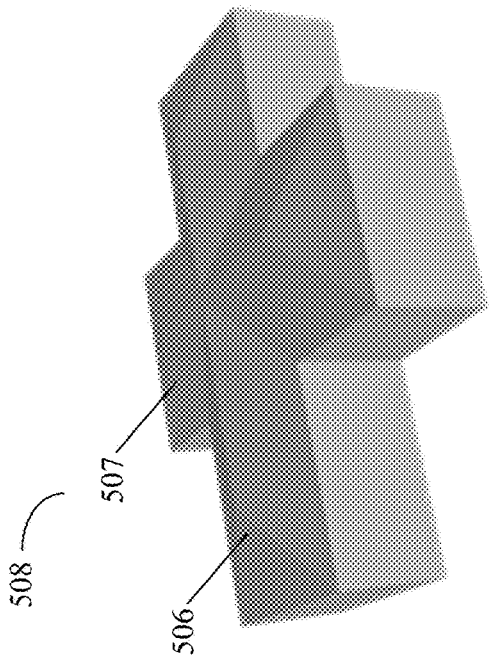
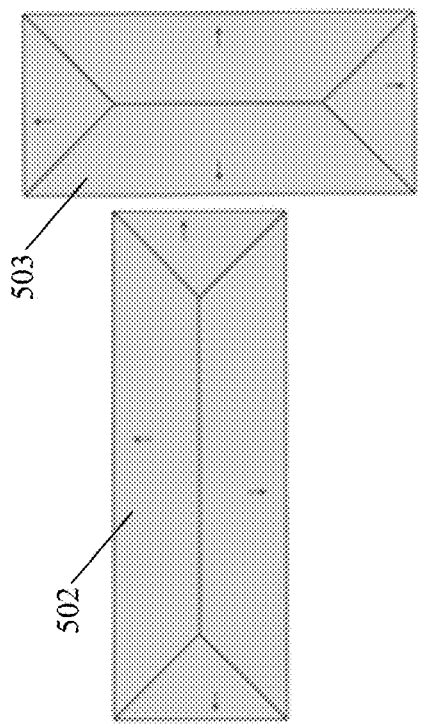
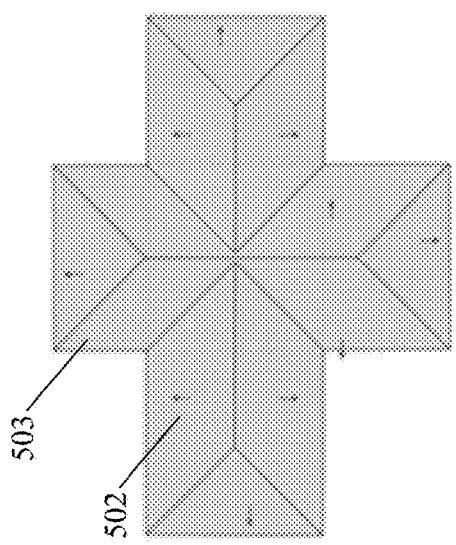
FIG. 5A
FIG. 5B
FIG. 5C
FIG. 5D

3D BUILDING MODELING SYSTEMS

CROSS-REFERENCE TO RELATED APPLICATION(S)

This application claims the benefit of U.S. Provisional Application No. 62/544,694, filed Aug. 11, 2017, of which the subject matter is incorporated herein by reference in its entirety.

BACKGROUND

1. Technical Field

The current application relates to constructing three-dimensional representations of building structures such as roofs.

2. Background Information

Constructing three-dimensional (3D) building structures such as roofs is useful and has many applications. However, conventional approaches have limitations in constructing complex roofs. Some solutions simplify the problem by modeling only roof planes of interest, for example by drawing an outline of a single roof face and assigning a pitch and an azimuth to it. Users may also manually create three-dimensional models in CAD software. In some cases, users may manually define an outline of a roof and use tools that convert a straight skeleton of the outline to 3D representations. All of these solutions have in common that they cannot model complex roof structures because they do not support for roof structures where perimeter edges are at different heights or roof structures that contain pitch changes. Additionally, these systems are usually general-purpose CAD tools that are complicated to use and thus require a lot of effort and a high degree of skill. This limits their use for applications that require a fast turn-around time and its use by unsophisticated users.

SUMMARY OF THE INVENTION

Described herein is a process and system for constructing three-dimensional (3D) representations of roof structures. Embodiments described herein can create representations of roof structures of arbitrary complexity and can create representations of dependent roof structures such as dormers. Embodiments described herein overcome the limitations of the conventional methods and can create representations of roof structures that conventional methods cannot create, such as roofs with edges that are not coplanar, roofs with faces that do not connect to exterior edges, roofs composed of sub-structures, or roofs with dependent structures such as dormers. Finally, the embodiments described herein, allow users to create complex roof structure much faster, and with less training required, than conventional methods.

BRIEF DESCRIPTION OF THE DRAWINGS

The invention has other advantages and features, which will be more readily apparent from the following detailed description of the invention and the appended claims, when taken in conjunction with the accompanying drawings, in which:

FIG. 1B is a flow chart illustrating an example process of constructing a 3D building representation, according to an embodiment.

FIG. 1C is a flow chart illustrating an example process of constructing a 3D building representation, according to an embodiment.

FIGS. 2A and 2B illustrate an example roof perimeter and a corresponding 3D building representation, respectively.

FIGS. 5A and 5B illustrate an example roof perimeter and a corresponding 3D building representation, respectively.

FIGS. 5C and 5D illustrate an example roof perimeter and a corresponding 3D building representation, respectively.

DETAILED DESCRIPTION OF THE DISCLOSURE

Figure 1A:
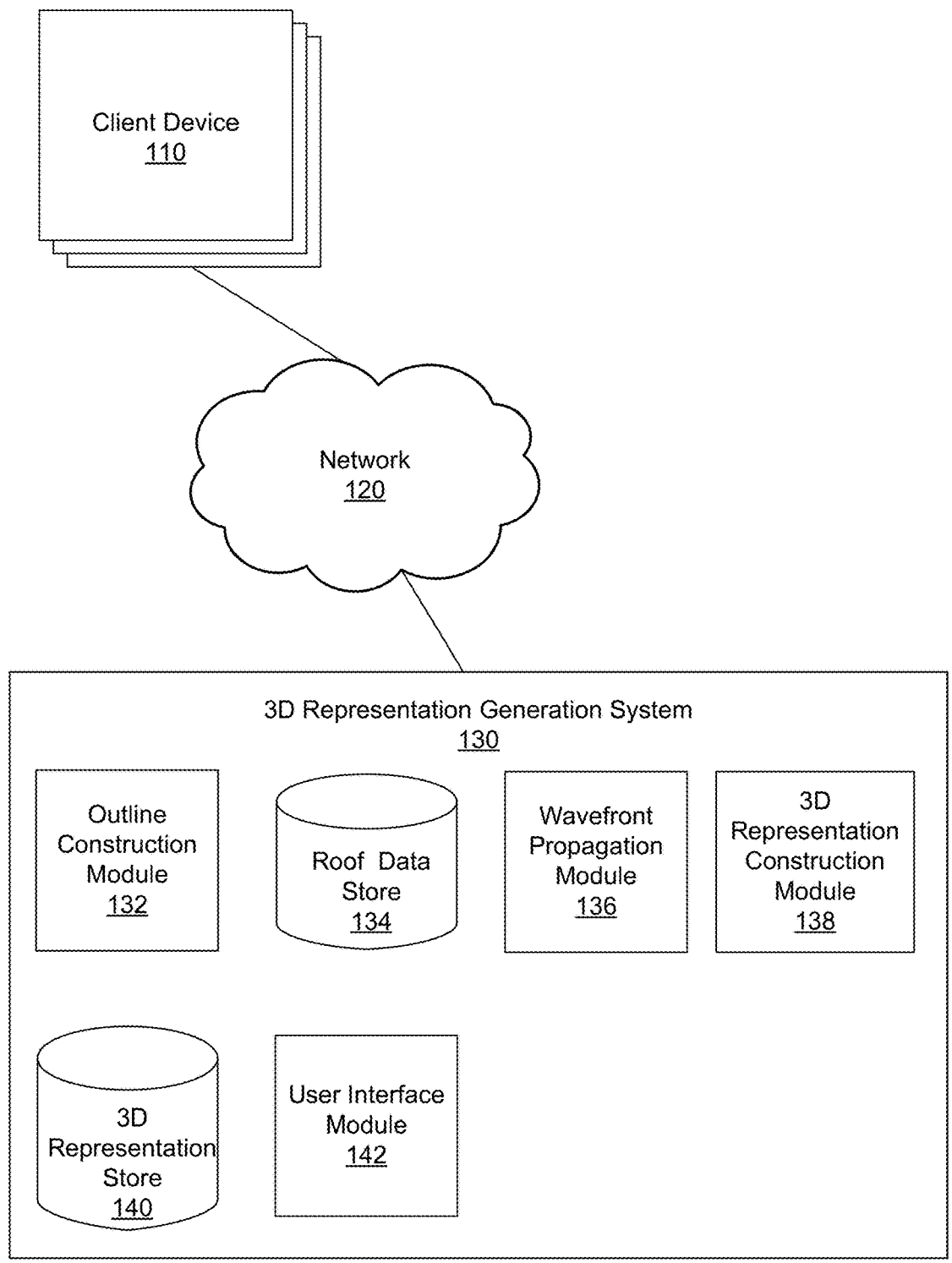
FIG. 1A illustrates a computing environment for generating three-dimensional (3D) building representations, according to one embodiment.

FIG. 1A illustrates a computing environment 100 for generating three-dimensional (3D) building representations, according to one embodiment. The environment includes entities such as client device 110, a 3D representation generation system 130, and a network 120. The network 120 connects the client devices 110 and the 3D representation generation system 130. In the illustrated example, only one 3D representation generation system is shown, but there may be multiple instances of the 3D representation generation system.

Client devices 110 include computing devices such as mobile devices (e.g., smartphones or tablets with operating systems such as Android or Apple iOS), laptop computers, desktop computers, or any other type of network-enabled device that enable users to interact with the 3D representation generation system 130. For example, the client devices 110 enable users to receive 3D representation generation services from the 3D representation generation system 130. A client device 110 may query an API hosted by the 3D representation generation system 130. A client device 110 typically includes hardware and software to connect to the network 120 (e.g., via Wi-Fi and/or Long Term Evolution (LTE) or other wireless telecommunication standards), and to receive input from the users. In addition, the client devices 110 enable users to provide the 3D representation generation system 130 with information such as 2D representations of buildings (e.g., a roof perimeter) and associated data (e.g., a pitch change point, a pitch change, a height of an edge, etc.), and user input for configuring 2D representations. In some embodiments, a user can interface with the 3D representation generation system 130 directly.

The network 120 is the communication pathway between the client devices 110 and the 3D representation generation system 130. In one embodiment, the network 120 uses standard communications technologies and/or protocols and can include the Internet. Thus, the network 120 can include links using technologies such as Ethernet, 802.11, Infini-Band, PCI Express Advanced Switching, etc. Similarly, the networking protocols used on the network 120 can include multiprotocol label switching (MPLS), transmission control protocol/Internet protocol (TCP/IP), User Datagram Protocol (UDP), hypertext transport protocol (HTTP) and secure hypertext transport protocol (HTTPS), simple mail transfer protocol (SMTP), file transfer protocol (FTP), etc. The data exchanged over the network 120 can be represented using technologies and/or formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above.

The 3D representation generation system 130 generates 3D representations of buildings. In various embodiments, the 3D representations of buildings are semantic models that include roof nodes, roof edges, as well as roof faces with associated properties (e.g., pitch, azimuth). A semantic roof model can be converted into other 3D models such as mesh-based formats. The 3D representation generation system 130 includes an outline construction module 132, a roof data store 134, a wavefront propagation module 136, a 3D representation construction module 138, a 3D representation store 140, and a user interface module 142, all of which are further described below.

The outline construction module 132 constructs roof perimeters. The roof perimeter is a polygon including nodes connected by edges. An edge of the polygon may be associated with a height value and/or a pitch value. The height value and the pitch value are both measured with respect to the ground plane. The associated data may also include pitch change points and an associated pitch (or a pitch change). A pitch change point is a 2D point in the ground plane. Referring now to FIG. 2B illustrating an example roof perimeter 200, the illustrated roof perimeter 200 is a polygon including nodes 201-206 connected by edges 211-216. The edges 211, 213, and 215 are each associated with their respective pitch. The roof perimeters are constructed according to information such as 2D representations (e.g., images, roof outlines, etc.) and associated data that may be received from the user interface module 142. The received information and the roof perimeters are stored in the roof data store 134.

In addition, the outline construction module 132 can determine a height value and/or a pitch value associated with a perimeter edge. For example, the outline construction module 132 determines a combination of height and pitch values associated with a given perimeter edge and/or point by using an optimization solver or similar methods. The height and pitch values can be determined iteratively based on information (e.g., a location of a perimeter node or an edge) input by a user, for example, received by the user interface module 142 as further described below. The information may be another program such as a computer vision module that detects roof features.

Referring back to FIG. 1A, the wavefront propagation module 136 propagates a wavefront to generate 3D model edges. The 3D model edges are used to construct the 3D representation of the building as further described below. Specifically, the wavefront propagation module 136 determines 2D cross-sections of the building based on the roof perimeter and associated data. A wavefront can be a polygon representing a horizontal cross-section of the building at a particular height. A wavefront edge represents the horizontal 2D cross-section of a roof face of the roof or a wall at a particular height. By propagating the wavefront in the three-dimensional space, nodes of the wavefront sweep out 3D model edges in the 3D representation, and edges of the wavefront sweep out roof faces or walls in the 3D representation. Points where the wavefront becomes self-intersecting define nodes in 3D representation where roof edges connect.

The propagation of the wavefront is determined according to the roof perimeter and associated data. For example, the wavefront propagation module 136 determines the geometry and dimension of the wavefront at a particular height according to the height value, the roof perimeter, and the associated data. At a particular height, the length and the propagation direction of a wavefront edge can be determined according to the roof perimeter, a height value and a pitch value associated with a corresponding perimeter edge. In addition, the length and the pitch of the wavefront edge can be further determined according to a pitch change point. The wavefront propagation module 136 determines a propagation direction of propagating a wavefront edge at a particular height according to the pitch value associated with the perimeter edge as further described below. The wavefront propagation module 136 propagates a wavefront such that all wavefront edges of the wavefront have the same height values. That is, the wavefront propagation module 136 propagates the wavefront such that the plane defined by the wavefront is parallel to the ground.

The wavefront propagation module 136 determines possible height values where the geometry of the wavefront changes. These height values correspond to locations where the building structure transitions. The wavefront propagation module 136 determines height values of three types of building structure change locations: 1) an intersection point between a wavefront edge and a wavefront node, 2) an intersection point between a wavefront edge and a pitch change point (i.e., the pitch change point overlaps the wavefront edge), and 3) a plane parallel to the ground plane corresponding to an edge height associated with a perimeter edge. The pitch change point overlaps the wavefront edge if a vertical projection of the wavefront edge in the ground plane coincides the pitch change point. The wavefront propagation module 136 determines the geometry of the wavefront at the possible height values. To determine the geometry of the wavefront, the wavefront propagation module 136 reconfigures a wavefront if it becomes self-intersecting. For example, the wavefront propagation module 136 merges nodes as described with respect to FIG. 1B.

The wavefront propagation module 136 determines a propagation direction of a wavefront edge according to a pitch value associated with the corresponding perimeter edge. If the corresponding perimeter edge is not associated with a pitch value, the wavefront propagation module 136 determines the propagation direction as upwards (i.e., 90°). The pitch of a wavefront edge describes how quickly the wavefront edge moves upwards (i.e., along the z direction) as the wavefront propagates inwards (i.e., in the horizontal plane towards the center of the wavefront). For example, if a perimeter edge is associated with a pitch value of 90°, the wavefront propagation module 136 determines to propagate the corresponding wavefront edge in a direction of 90° with reference to the ground (i.e., upwards). As another example, if a perimeter edge is associated with a pitch value of 60°, the wavefront propagation module 136 determines to propagate the wavefront edge in a direction of 60° with reference to the ground plane. That is, the wavefront propagation module 136 increases the height of the wavefront edge by sin 60° for every unit the wavefront edge moves towards the center of the wavefront. At the particular height, the wavefront propagation module 136 applies pitch changes for a wavefront edge if the pitch change is specified for the corresponding perimeter edge at the particular height, or for any edges that overlap any 2D pitch change points.

The wavefront propagation module 136 propagates the wavefront of a particular geometry until it reaches a possible height value where the geometry of the wavefront changes, or until it reaches a specified height value associated with a perimeter edge. The wavefront propagation module 136 determines the geometry of the wavefront when the propagation reaches a possible height value where the geometry of the wavefront changes, or when it reaches the specified height of a perimeter edge, as described above. For example, the wavefront propagation module 136 propagates the wavefront upwards (i.e. with a pitch of 90°) until it reaches a height value of the perimeter edge. If a perimeter edge is not associated with a height value and a pitch value, the wavefront propagation module 136 propagates the corresponding wavefront edge upwards (i.e., with a pitch of 90°) until the wavefront edge intersects another wavefront edge. The wavefront propagation module 136 adjusts the direction of propagating a wavefront edge after reaching the specified height value associated with the corresponding perimeter edge.

The wavefront propagation module 136 generates 3D model edges during propagation of the wavefront. The 3D model edges are edges of the 3D representation. A 3D model edge can be the path that a wavefront node traverses during propagation of a wavefront edge. For a wavefront of a particular geometry, the wavefront propagation module 136 generates a 3D model edge connecting a node of the wavefront from the node's starting position to its end position in the wavefront. The wavefront propagation module 136 generates a 3D model edge along the wavefront edge to which a pitch change is applied.

For each 3D model edge generated along the traversing paths of nodes, the wavefront propagation module 136 further records two roof faces to which the 3D model edge is adjacent on the left and right. For wavefronts that are solely represented by a line, the 3D representation generation system 130 emits a 3D model edge between the two nodes of the wavefront and records the two roof faces that form it. For a wavefront that contains a roof face with a pitch of zero (i.e. flat), the wavefront propagation module 136 generates a single roof face that fills the remaining area inside the wavefront. For each 3D model edge generated along the wavefront edge to which the pitch change is applied, the wavefront propagation module 136 records the two roof faces to which the 3D model edge is adjacent.

The 3D representation construction module 138 constructs a 3D representation of the building. The 3D representation construction module 138 generates a half-edge graph based on the 3D model edges generated by the wavefront propagation module 136. Each roof face is defined by half-edges in one direction (e.g., counter-clockwise) around the outside of the roof face. For each roof face, the 3D representation construction module 138 extracts all half-edges that belong to that roof face. The 3D representation construction module 138 then extracts polygons from the half-edge graph, for example, by traversing roof faces of the half-edge graph in one direction (e.g., a counter-clockwise edge traversal) until all roof faces are traversed. The 3D representation construction module 138 simplifies the half-edge graph. Specifically, the 3D representation construction module 138 merges nodes separated by a distance shorter than a threshold distance. The generated 3D representation is stored in the 3D representation store 140.

The user interface module 142 generates user interfaces (UIs) for users to provide user input to adjust the resulting 3D representations. For example, via user interfaces, a user can modify roof perimeters such as node locations, connectivity between edges, edge characteristics such as height values and pitch values associated with the one or more perimeter edges. Example UIs are further described below.

The user interface module 142 generates a UI that enables the user to modify positions of edges. The UI includes UI interface elements configured to be triggered by users to reposition edges. The edges can be edges in 2D representations (e.g. an orthographic aerial or satellite image) or 3D representations. For example, the UI presents a 2D top-down view of a roof. The UI includes UI elements that can be triggered by a user action (e.g., clicking on) selecting a point (x, y, z) on an edge and by another user action (e.g., dragging) the point to a new location (x', y', z'). As a result, the edge is repositioned. The length, height, and/or pitch of the edge can be modified by other user actions, such as dragging of the nodes of an edge or dragging of interior edges. The UI is configured to provide the received user input to the outline construction module 132. Based on the user input, the outline construction module 132 updates the roof data and/or the 3D representation of the building. The point of which the location is modified is assumed to remain on both roof planes to which the original edge is adjacent.

The outline construction module 132 determines new heights and/or pitches for an interior (i.e., non-perimeter) edge that is repositioned. As one example, the outline construction module 132 maintains the heights of the 3D perimeter edges of both roof faces adjacent to the edge being repositioned constant. The outline construction module 132 updates the pitches of the adjacent roof faces such that both roof faces contain the dragged point (x', y', z) (z' is the same as z in this case.) As another example, the outline construction module 132 maintains the pitches of the roof faces adjacent to the edge constant, and adjusts (e.g., decrease or increase) the height of the base edge of one of the adjacent bases such that both roof faces contain the dragged point (x', y', z). As a further example, the outline construction module 132 maintains the pitches of the roof faces adjacent to the edge constant, and adjusts the heights of the base edges of both adjacent roof faces such that both roof faces contain the dragged point (x', y', z). The outline construction module 132 may combine one or more individual steps such as changing the pitch of one roof face and lowering the edge of another roof face, or averaging out the height difference of two edges.

The user interface module 142 generates a UI that enables the user to modify positions of nodes. Similar to the UI described above that allows the user to adjust a position of the edge, the UI includes user interface elements configured to be triggered by users to reposition a roof node. For example, the UI includes UI elements that can be triggered by a user action (e.g., clicking on) selecting a roof node (x, y, z) and by another user action (e.g., dragging) the roof node to a new location (x', y', z'). The UI provides the received user input to the outline construction module 132. Based on the user input, the outline construction module 132 adjusts the properties (pitch, height) of three roof faces to which the roof node is adjacent. As one example, the outline construction module 132 adjusts the pitches of the three roof faces while keeping the heights constant. As another example, the outline construction module 132 adjusts (e.g., increases or decreases) one or more of the roof edges to which the roof node is adjacent while keeping the pitches constant. As a further example, the outline construction module 132 raises roof edges while keeping the pitches constant. The outline construction module 132 may adjust the heights, for example, by averaging out the required height differences while keeping the pitches constant. The outline construction module 132 may combine one or more individual steps such as adjusting the height and/or the pitch of one or more roof edges.

Figure 6B:
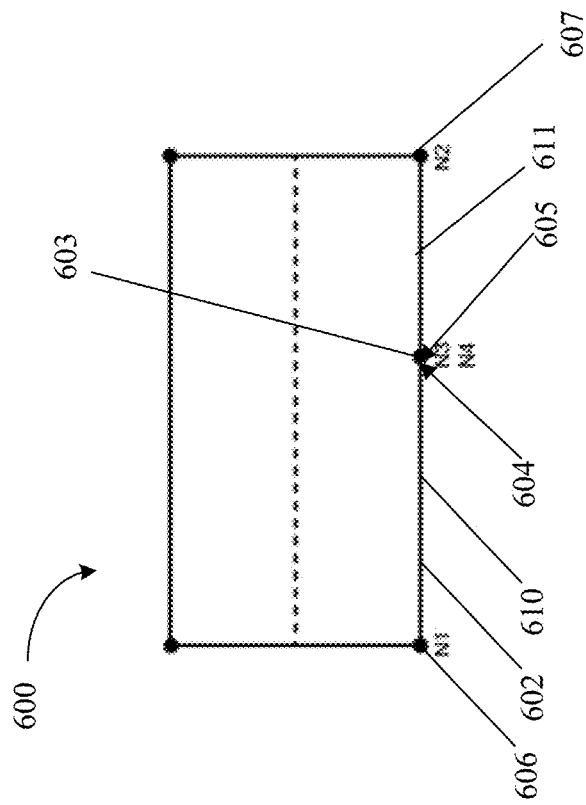
FIGS. 6A through 6F illustrate example user interfaces, according to an embodiment.
Figure 6A:
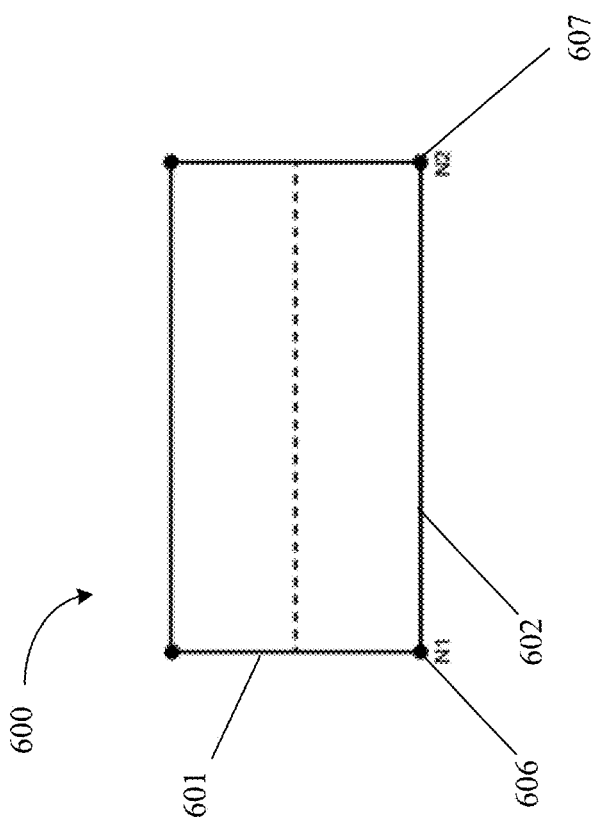

The user interface module 142 generates a UI that enables the user to edit roof perimeters. Users can create 3D representations of a complex building by editing a roof perimeter. The UI includes user interface elements configured to be triggered by user actions (e.g., clicking on, dragging, dropping, etc.) to modify the roof perimeter, i.e. the nodes, edges and connectivity of the roof outline. Based on a user interaction, the outline construction module 132 adjusts the roof perimeter. For example, as illustrated in FIG. 6B, the UI 600 includes a user interface element 603 that is configured to be triggered by a user to insert a point on the edge. Based on the user input, the outline construction module 132 updates the perimeter 601 by inserting two nodes 604-605 to the edge 602. The outline construction module 132 further updates the perimeter by replacing the edge 602 with edges 610 and 611. Users can insert as many points into edges as desired. This allows users to easily shape roof structures.

Figure 6D:
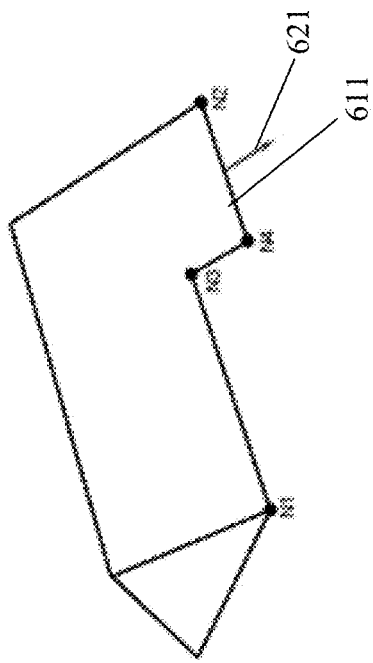
Figure 6F:
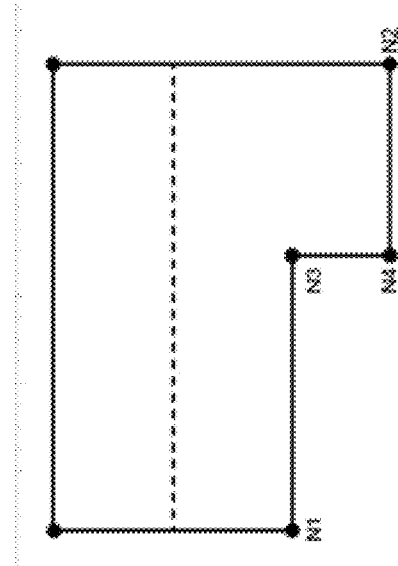
Figure 6C:
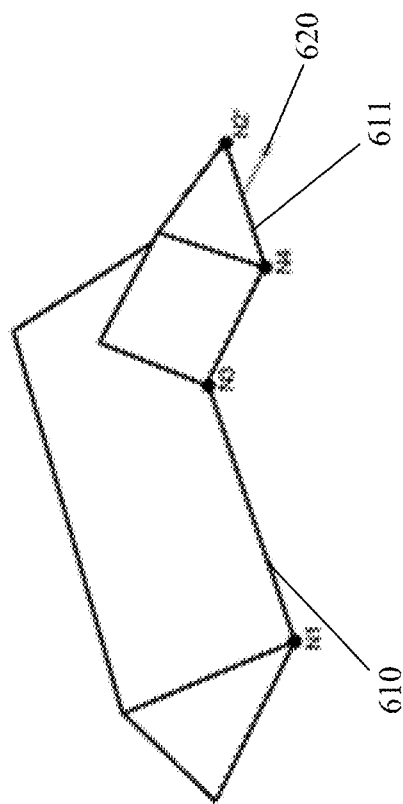
Figure 6E:
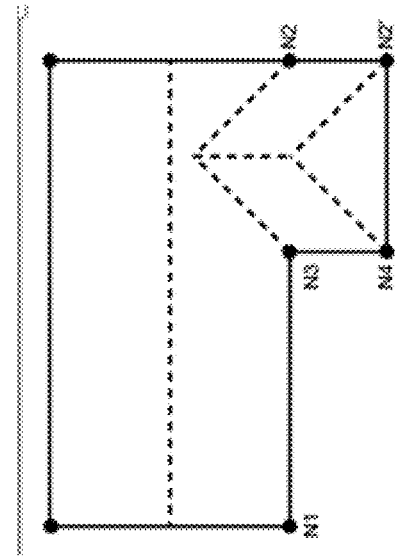

The UI also include user elements configured to be triggered to reposition edges. For example, as illustrated in FIGS. 6C-D, a user can drag an edge to a new position. The UI may restrict the new position relative to the original position. For example, the user interface element 620 illustrated in FIG. 6C and the user interface element 621 are configured to restrict the direction of moving the edge 611 that is being selected. The user interface elements 620-621 are configured to attach to a selected edge (e.g., edge 611) to present the user with the direction of repositioning the edge. The direction could be, for example, in a horizontal plane parallel to the ground or in a plane along the roof face as illustrated by the user interface elements 620 and 621, respectively. In response to the user input, the outline construction module 132 updates the roof perimeter. For example, if the user repositions the edge 611 in FIG. 6B in a plane parallel to the ground, the outline construction module 132 updates the roof perimeter by adding one or more new roof faces as illustrated in FIG. 6E. If the user repositions the edge 611 in FIG. 6B in the plane of the roof face, the outline construction module 132 reshapes the roof face as illustrated in FIG. 6F.

Figure 7A:
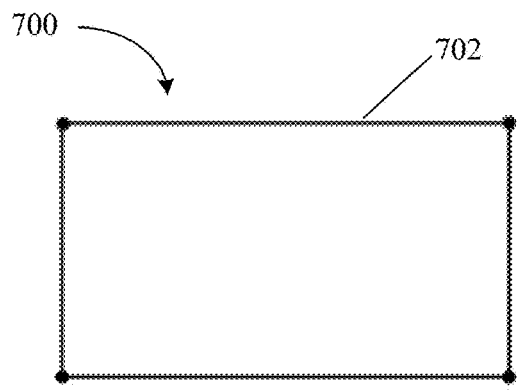
FIGS. 7A through 7E illustrate example user interfaces, according to an embodiment.
Figure 7B:
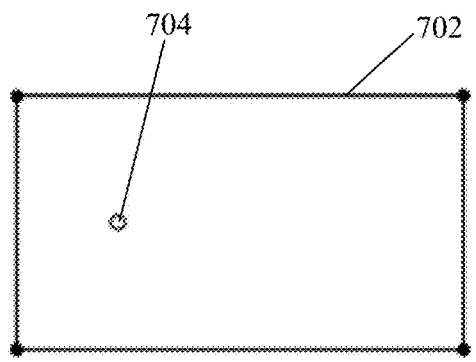
Figure 7C:
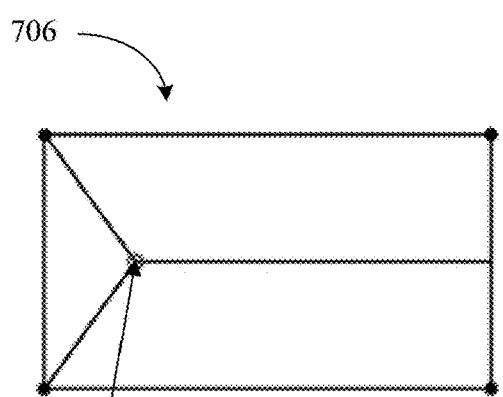
Figure 7D:
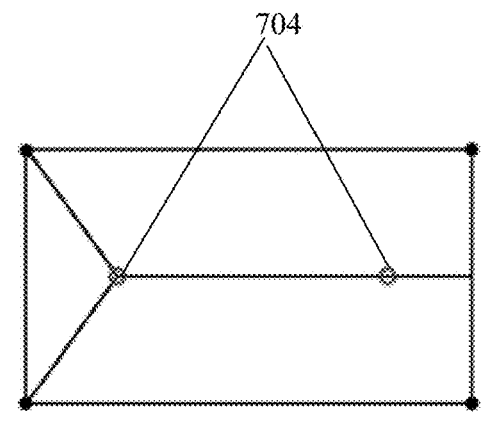
Figure 7E:
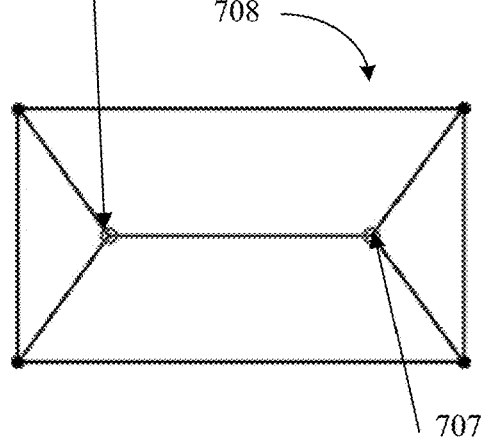

The user interface module 142 generates a UI that includes user interface elements configured to be triggered to construct a roof perimeter. Users can configure an outline of the roof, nodes, and, in some embodiments, a number of specified interior nodes or edges. A node can be a 2D node or a 3D node and an edge can be a 2D edge or a 3D edge. The UI interface may be configured to include user interface elements configured to receive information such as the location of a node or an edge from a user. Based on the user input, the outline construction module 132 constructs the roof perimeter. For example, as illustrated in FIG. 7A, the UI 700 includes user interface elements configured to be triggered by a user to draw an outline 702 of a roof. As illustrated in FIGS. 7B through 7E, the user interface element 704 is configured to be triggered by a user to insert a first node 705 and a second node 707 in the outline 702, respectively. The outline construction module 132 constructs the perimeters of the roof 706 and 708 based on the user input concurrently while the user configures the perimeter.

FIG. 1B is a flow chart illustrating an example process of constructing a 3D building representation, according to an embodiment. The example process receives 152 a roof perimeter. The roof perimeter is described with reference to FIG. 1A.

Figure 3B:
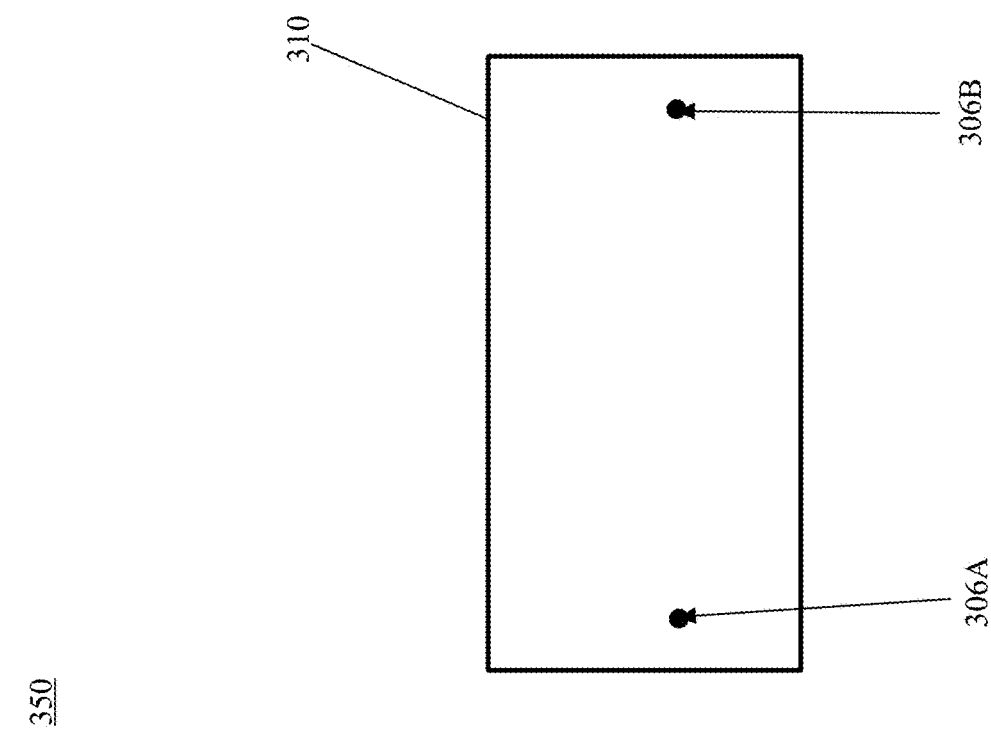
FIGS. 3A and 3B illustrate an example 3D building representation and a corresponding roof perimeter, respectively.
Figure 3A:
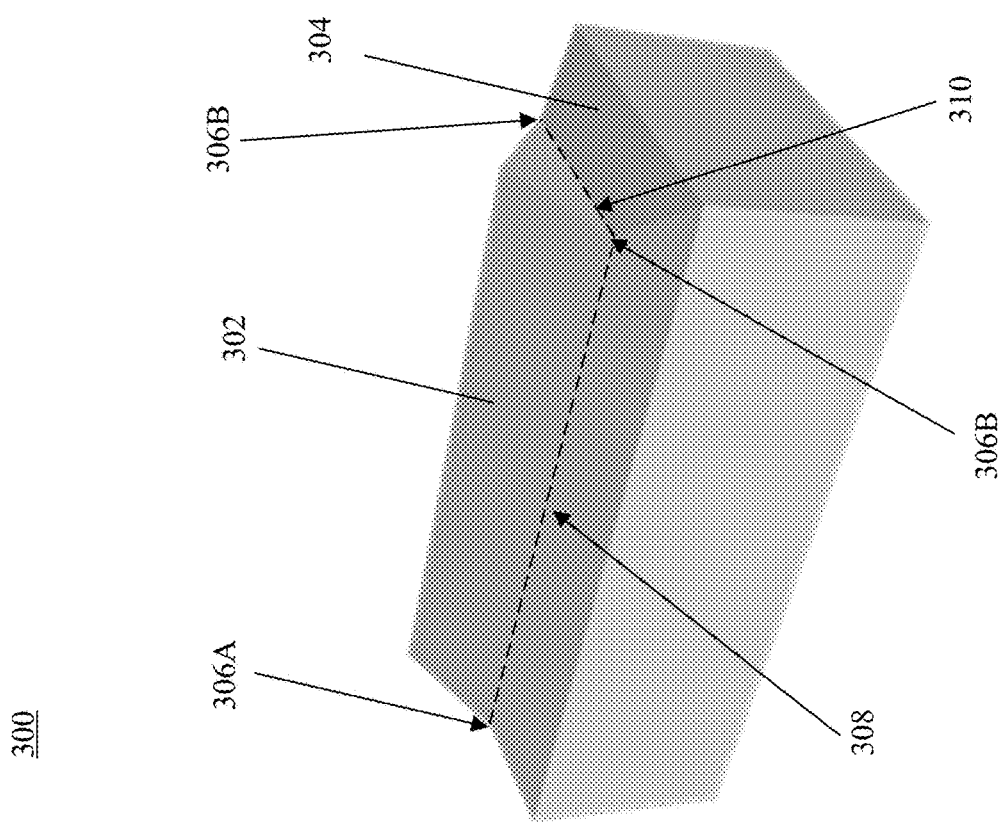

The 3D representation generation system 130 locates 154 pitch change points. A pitch change point is described above with respect to FIG. 1A. The direction of propagating a wavefront edge is determined based on the pitch value associated with the perimeter edge as described herein. For example, a degree of propagating an edge inward relative to a degree of propagating the edge upward is determined according to the pitch of the edge. In some embodiments, pitch change points and an associated pitch (or a pitch change) are received from users. One example is illustrated in FIG. 3A. FIG. 3B illustrates the roof perimeter 350 that is received. As illustrated, the top pyramid roof structure 302 is formed by a pitch change in comparison to the lower roof structure 304. The points 306A-B are pitch change points, i.e., if a wavefront edge overlaps with one of these pitch change point, the propagation direction of the wavefront edge changes. Take the pitch change point 306B as one example: the propagation direction of the wavefront edges 308 and 310 change when the wavefront edges 308 and 310 overlap the pitch change point 306B.

A user can define any number of pitch change points. As such, the 3D representation generation system 130 described herein can model complicated roofs such as mansard roofs (i.e. a roof that has four sloping sides and a flat face on top), gambrel roofs (e.g. the typical shape of a barn), and Dutch gable roofs (e.g., the roof structure 300 illustrated in FIG. 3A).

The 3D representation generation system 130 determines 156 roof structure change height values. The 3D representation generation system 130 maintains a list of height values at which the geometry of the wavefront may change. The 3D representation generation system 130 detects height values to avoid sweeping a large number of infinitesimal vertical steps. The 3D representation generation system 130 determines heights at which the propagation direction of the wavefront transitions. When wavefront edges of the wavefront intersect each other, the geometry of the wavefront changes. 3D model edges can be generated. The 3D representation generation system 130 determines height values of three types of roof structure change locations as described above.

The 3D representation generation system 130 determines if a wavefront edge intersects a wavefront node. This intersection is a 3D point. For example, the 3D representation generation system 130 determines this intersection between a wavefront node and a wavefront edge by finding an intersection of three planes: two planes defining the wavefront edge and a third plane that, in conjunction with the wavefront edge, defines the wavefront node. The 3D representation generation system 130 extracts the height value from this self-intersection point. In each iteration (i.e., propagating a wavefront of a particular geometry along a particular direction), the 3D representation generation system 130 analyzes all possible edge-node intersections.

The 3D representation generation system 130 detects if a wavefront edge intersects a 2D pitch change point. The 3D representation generation system 130 determines the height of the point of intersection using the distance from the wavefront edge to the point and the direction associated with the perimeter edge corresponding to the wavefront edge. In each iteration (i.e., propagating a wavefront of a particular geometry along a particular direction), the 3D representation generation system 130 analyzes all possible intersections of wavefront edges and pitch-change points.

The 3D representation generation system 130 propagates 158 wavefronts to the building structure change height values (i.e., height values of locations at which the building structure may change). The 3D representation generation system 130 propagates wavefront edges along the associated directions until the wavefront reaches the lowest height value of the building structure change height values.

In each iteration, for each node of the wavefront, the 3D representation generation system 130 generates a 3D model edge. The generation of 3D model edges is described in connection with FIG. 1A.

The 3D representation generation system 130 updates 160 self-intersecting wavefront edges and applies pitch changes. After propagation in each iteration, the wavefront edges may intersect with each other. The 3D representation generation system 130 merges nodes of which the distance is within a threshold distance. In addition, the 3D representation generation system 130 merges wavefront edges that are collinear into a collinear group. For the edges of the collinear group, the 3D representation generation system 130 selects the minimum pitch and sets the minimum pitch for all the edges in the group.

For any wavefront edge corresponding to a perimeter edge to which a pitch change is specified at the height value, the 3D representation generation system 130 applies the specified pitch change to the wavefront edge. The 3D representation generation system 130 further applies a pitch change to a wavefront edge that intersects a pitch change point.

In addition, the 3D representation generation system 130 splits a wavefront if it intersects a wavefront node. The 3D representation generation system 130 splits the wavefront edge into shorter non-intersecting edges. To do this, the 3D representation generation system 130 traverses the wavefront edge in one direction until all segments of the wavefront edge are traversed.

The 3D representation generation system 130 repeats determining roof structure change height values, propagating wavefronts, and updating self-intersecting wavefronts until propagation completes for all roof structure change height values.

The 3D representation generation system 130 generates 162 a 3D representation. In various embodiments, the 3D representation is a polyhedron. To generate the 3D model, the 3D representation generation system 130 generates a half-edge graph by collecting all 3D model edges emitted during all iterations of propagation. Each half-edge is tagged with the roof face to which it belongs. A perimeter edge and a pitch change together define a roof face. For each 3D model edge generated, there are a left roof face and a right roof face. For the left roof face, the 3D representation generation system 130 generates a half-edge with the nodes in the original order. For the right face, the 3D representation generation system 130 generates a half-edge with the nodes in reverse order. Subsequently, the 3D representation generation system 130 simplifies the half-edge graph by merging nodes separated by a distance shorter than a threshold distance and by combining collinear 3D model edges into one 3D model edge. Nodes that connecting the collinear 3D model edges are removed. As a result, each roof face is defined by half-edges in one direction (e.g., counter-clockwise) around the outside of the roof face.

For each roof face, the 3D representation generation system 130 extracts all half-edges that belong to that roof face. The 3D representation generation system 130 then extracts polygons from the half-edge graph, for example by traversing roof faces of the half-edge graph in one direction (e.g., a counter-clockwise edge traversal) until all roof faces are traversed.

The 3D representation generation system 130 described in connection with FIG. 1A constructs 3D models for simple structures in form of a watertight polyhedron. A simple structure includes one roof structure, in comparison to a complex structure that includes multiple structure components including one independent structure and at least another structure. The other structure can be another independent structure or a structure dependent on the independent structure.

FIG. 1C is a flow chart illustrating an example process of constructing a 3D model of a complex structure including an independent structure and a dependent structure.

Figure 4B:
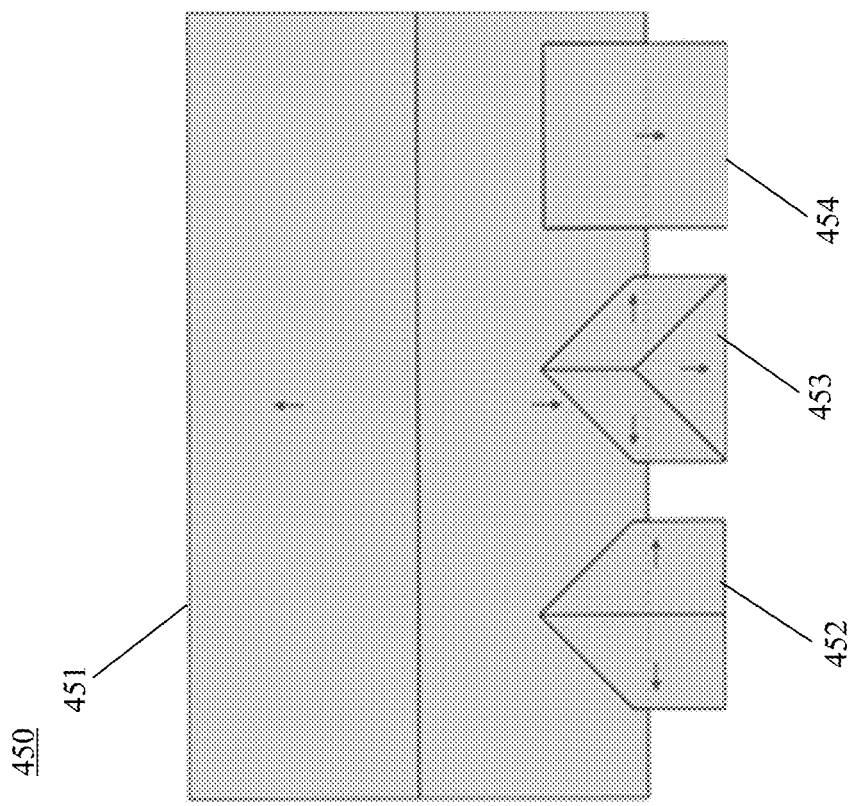
FIGS. 4A and 4B illustrate an example 3D building representation and a corresponding roof perimeter, respectively.
Figure 4A:
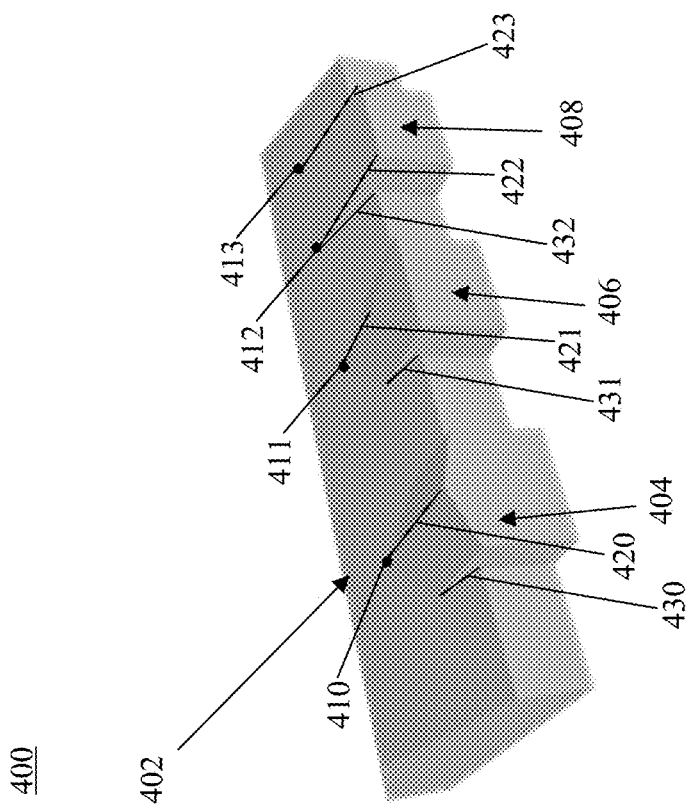

The 3D representation generation system 130 receives 182 a perimeter of a roof of an independent structure and a dependent structure. A dependent structure is a parametrized structure of which geometric properties depend on the independent building structure to which it is attached. A dependent structure can be provided by a user or a by a different process. Example dependent structures include obstructions and dormers, among others. An obstruction is a structure on top of the independent roof, such as a skylight, a chimney or an AC unit. A dormer is a part of the roof structure that can be represented as another structure attached to and standing out from the independent roof. Three examples of dormers are illustrated in FIG. 4A. As illustrated, the roof structure 402 is the main roof structure and the roof structures 404, 406, 408 are dormers. The roof structure 404 is a gabled dormer, the roof structure 406 is a hipped dormer, and the roof structure 408 is a shed dormer. As illustrated in FIG. 4B, an example roof perimeter 450 of a complex structure. The portion 450 corresponds to the independent roof and the portions 452-454 correspond to the three dependent roofs.

The 3D representation generation system 130 generates 184 a 3D representation of the independent structure, following the 3D representation generation system 130 described with respect to FIGS. 1A-1B.

The 3D representation generation system 130 generates 186 a 3D representation of the dependent structure based on the 3D representation of the independent structure and the dependent structure. The 3D representation is generated based on the geometric shape of the dependent structure, which can be parametrized (i.e., by specifying dormer length, width and dormer face pitch value(s)) as well as a location with respect to the independent roof structure. For example, if a dependent structure is a circular obstruction, the 3D representation generation system 130 generates a cylinder defined by a center point, a radius, and a width. As another example, the 3D representation generation system 130 generates a rectangular prism defined by a center point, a width, a height, and a rotation relative to the underlying roof face of the independent roof. As a further example, the 3D representation generation system 130 generates a polygonal prism defined by a set of points and a height. In addition, the 3D representation is generated based on a relative location on an underlying roof face. For example, the 3D representation generation system 130 determines a height value and an orientation of the obstruction (if applicable) based on the roof face of the independent structure it is positioned on.

If a dependent structure is a dormer, the 3D representation generation system 130 may define the 3D representation based on a control point (e.g., nodes 410-413 of FIG. 4A), for example at the top of the dormer where it intersects the independent roof. At this control point, the 3D representation generation system 130 subsequently determines parameters (e.g., the height, the azimuth, and the pitch) of the underlying roof face of the independent roof structure. The 3D representation generation system 130 generates the 3D representation of the dormer by using the parameters (e.g., the height, the azimuth, and the pitch) of the roof face in combination with properties of the dormer structure. The properties of the dormer structure can include a shape, a pitch, a length, and a width, for example.

In this representation, the dormer points outward along the azimuth of the underlying roof face and intersects it at the given height. To do this, the 3D representation generation system 130 finds the roof face and a control point on the roof. The 3D representation generation system 130 projects a horizontal line from the control point out along the azimuth of this roof face to define the ridge line (e.g., the edges 420-423) of the dormer. For hipped and gabled dormers, the 3D representation generation system 130 further determines valley edges (e.g., the edges 430-432) where the dormer intersects the roof by using the pitch of the roof face and the pitch of the dormer face. The 3D representation generation system 130 further extends the ridge line and the eaves connected to the bottom nodes of the valley edges until the dormer reaches the specified width and length (accounting for the pitch of the front dormer face in case of a hipped dormer). If the independent structure changes or any of the dependent structure's parameters change, the 3D representation generation system 130 recreates the 3D representation of the dependent structure.

The 3D representation generation system 130 combines 188 the 3D representation of the independent structure and the 3D representation of the dependent structure thereby to create a 3D representation of the building structure. These multiple 3D representations are combined by applying the constructive solid geometry (CSG). That is, the multiple 3D representations are combined by using Boolean operators (e.g., union, difference, intersection). For example, the 3D representations 506-507 shown in FIG. 5B are created based on the 2D perimeters of the roofs 502-503 shown in FIG. 5A, respectively. As illustrated in FIG. 5C, the 2D perimeters 502-503 are positioned to overlap with each other. The 3D representation generation system 130 combines the 3D representations 506-507 as illustrated in FIG. 5D according to the relative position of the 2D perimeters 502-503 as shown in FIG. 5C. FIG. 5C further illustrates this process by indicating the original roof structure (solid and transparent lines) overlaid with the combined roof structure resulting from the CSG operation (solid lines). While the figured provided illustrate simple cases, the methods described herein can be combined to model roof structures of arbitrary complexity. It is noteworthy that—compared to regular CSG techniques that operate on general mesh structures—this process has, and is able to preserve, all relevant semantic properties of the roof (e.g. of what type roof edges are and what constitutes a roof face, a wall, dormer elements or which geometry is a roof obstruction).

For complex structures that include two independent structures, the 3D representation generation system 130 generates 3D representations of the independent structures according to the process described with reference to FIG. 1B. The 3D representation generation system 130 combines the 3D representations of the independent structures similar to the combination process described with respect to step 188 described above with respect to FIG. 1C.

Figure 8:
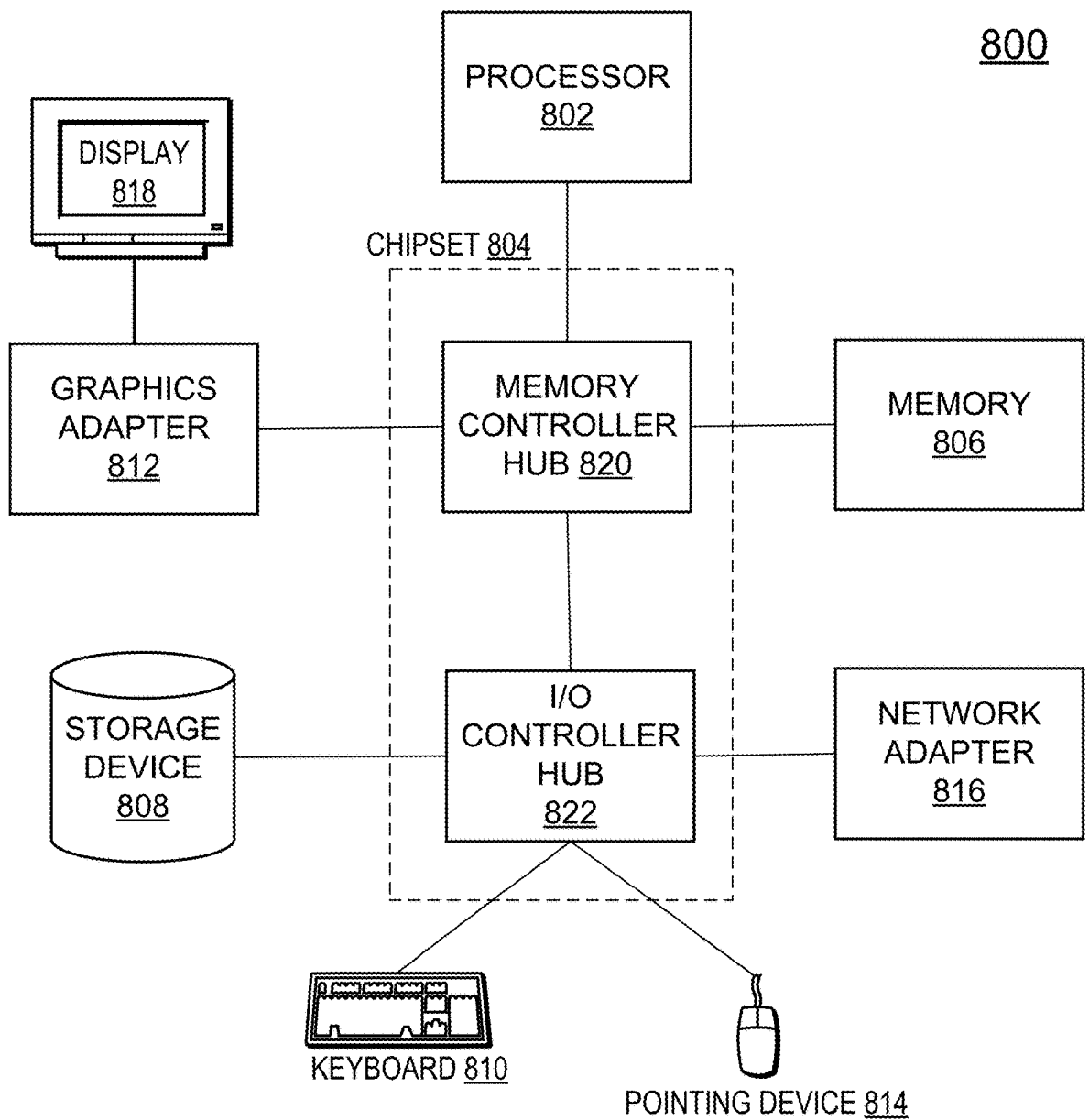
FIG. 8 is a high-level block diagram illustrating an example computing system.

Turning now to a discussion of the implementation the 3D representation generation system 130, FIG. 8 is a high-level block diagram illustrating an example computer 800 for implementing the entities shown in FIG. 1. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input device 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information on the display 818. The network adapter 816 couples the computer 800 to one or more computer networks.

The computer 800 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computers 800 used by the entities of FIG. 1 can vary depending upon the embodiment and the processing power required by the entity. For example, the 3D representation generation system 130 can run in a single computer 800 or multiple computers 800 communicating with each other through a network such as in a server farm. The computers 800 can lack some of the components described above, such as graphics adapters 812, and displays 818.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:
   receiving a roof perimeter, the perimeter including a set of nodes and edges, at least one edge associated with a pitch, the perimeter representing an outline of the roof;
   modeling a wavefront from the perimeter, the wavefront at a first height being a first polygon corresponding to a first horizontal cross-section of the roof; and
   propagating the wavefront vertically in a parallel manner, next wavefronts at increasing heights being other polygons corresponding to other horizontal cross-sections of the roof, at least one wavefront edge propagating from the first height to at least one of the increasing heights at a speed corresponding to the pitch.

2. The method of claim 1, further comprising:
   constructing a three-dimensional (3D) model of the roof from at least the first horizontal cross-section and one or more of the other horizontal cross-sections, at least a first 3D model edge generated from connecting a first node of the wavefront at the first height and one or more other nodes of one of more next wavefronts at one or more increasing heights.

3. The method of claim 2, wherein the 3D model constructed comprising the first 3D model edge and a second 3D model edge, the first and second 3D model edges connect in the 3D model at a point where the wavefront is self-intersecting.

4. The method of claim 1, further comprising:
   determining a height value at an intersection point between the wavefront edge and a pitch change point.

5. The method of claim 1, further comprising:
   determining a direction of propagation of the wavefront edge according to a pitch value associated with a perimeter edge.

6. The method of claim 1, further comprising:
   parametrizing a dependent structure of the roof in the first horizontal cross-section.

7. The method of claim 1, wherein the wavefront is a first wavefront, the first horizontal cross-section of the roof corresponding to the first polygon is a partial cross-section of the roof, and the method further comprises:
   modeling at least a second wavefront from the perimeter; and
   propagating at least the second wavefront vertically in parallel along with the first wavefront.

8. A non-transitory computer readable medium for storing instructions, the instructions, when executed by one or more processors, cause the one or more processors to perform steps comprising:
   receiving a roof perimeter, the perimeter including a set of nodes and edges, at least one edge associated with a pitch, the perimeter representing an outline of the roof;
   modeling a wavefront from the perimeter, the wavefront at a first height being a first polygon corresponding to a first horizontal cross-section of the roof; and
   propagating the wavefront vertically in a parallel manner, next wavefronts at increasing heights being other polygons corresponding to other horizontal cross-sections of the roof, at least one wavefront edge propagating from the first height to at least one of the increasing heights at a speed corresponding to the pitch.

9. The non-transitory computer readable medium of claim 8, wherein the steps further comprise:
   constructing a three-dimensional (3D) model of the roof from at least the first horizontal cross-section and one or more of the other horizontal cross-sections, at least a first 3D model edge generated from connecting a first node of the wavefront at the first height and one or more other nodes of one of more next wavefronts at one or more increasing heights.

10. The non-transitory computer readable medium of claim 9, wherein the 3D model constructed comprising the first 3D model edge and a second 3D model edge, the first and second 3D model edges connect in the 3D model at a point where the wavefront is self-intersecting.

11. The non-transitory computer readable medium of claim 8, wherein the steps further comprise:
    determining a height value at an intersection point between the wavefront edge and a pitch change point.

12. The non-transitory computer readable medium of claim 8, wherein the steps further comprise:
    determining a direction of propagation of the wavefront edge according to a pitch value associated with a perimeter edge.

13. The non-transitory computer readable medium of claim 8, wherein the steps further comprise:
    parametrizing a dependent structure of the roof in the first horizontal cross-section.

14. The non-transitory computer readable medium of claim 8, wherein the wavefront is a first wavefront, the first horizontal cross-section of the roof corresponding to the first polygon is a partial cross-section of the roof, and the steps further comprise:
    modeling at least a second wavefront from the perimeter; and
    propagating at least the second wavefront vertically in parallel along with the first wavefront.

15. A system comprising:
    one or more processors; and
    memory storing instructions, the instructions, when executed by the one or more processors, cause the one or more processors to perform steps comprising:
      receiving a roof perimeter, the perimeter including a set of nodes and edges, at least one edge associated with a pitch, the perimeter representing an outline of the roof;

modeling a wavefront from the perimeter, the wavefront at a first height being a first polygon corresponding to a first horizontal cross-section of the roof; and propagating the wavefront vertically in a parallel manner, next wavefronts at increasing heights being other polygons corresponding to other horizontal cross-sections of the roof, at least one wavefront edge propagating from the first height to at least one of the increasing heights at a speed corresponding to the pitch.

16. The system of claim 15, wherein the steps further comprise:

constructing a three-dimensional (3D) model of the roof from at least the first horizontal cross-section and one or more of the other horizontal cross-sections, at least a first 3D model edge generated from connecting a first node of the wavefront at the first height and one or more other nodes of one of more next wavefronts at one or more increasing heights.

17. The system of claim 16, wherein the 3D model constructed comprising the first 3D model edge and a second 3D model edge, the first and second model edges connect in the 3D model at a point where the wavefront is self-intersecting.

18. The system of claim 15, wherein the steps further comprise:

determining a height value at an intersection point between the wavefront edge and a pitch change point.

19. The system of claim 15, wherein the steps further comprise:

determining a direction of propagation of the wavefront edge according to a pitch value associated with a perimeter edge.

20. The system of claim 15, wherein the wavefront is a first wavefront, the first horizontal cross-section of the roof corresponding to the first polygon is a partial cross- section of the roof, and the steps further comprise:

modeling at least a second wavefront from the perimeter; and propagating at least the second wavefront vertically in parallel along with the first wavefront.

* * * * *